United States Patent Office 3,135,619
Patented June 2, 1964

3,135,619
DESTRUCTIVE DISTILLATION OF GILSONITE
AND PRODUCTS THEREOF
Nathan W. Davis, 3474 S. 23rd St.,
Salt Lake City 6, Utah
No Drawing. Original application Aug. 15, 1956, Ser.
No. 604,085, now Patent No. 3,003,944, dated Oct. 10,
1961. Divided and this application Nov. 13, 1962,
Ser. No. 237,389
2 Claims. (Cl. 106—248)

This invention relates to hydrocarbons obtained by destructive distillation of Gilsonite and to products made from the distillates.

This application is a division of my application Serial No. 604,085, filed August 15, 1956, now Patent No. 3,003,944, issued October 10, 1961, and a continuation-in-part of my application Serial No. 846,526, filed September 21, 1959, and now abandoned.

It is an object of this invention to destructively distill Gilsonite and to obtain therefrom various fractions each of which are separate and distinct insofar as they have different physical and chemical properties.

It is a further object of this invention to use one or more of these fractions in compounding a paint composition.

Gilsonite is a black, brittle, lustrous mineral consisting of hydrocarbons, chiefly found in the southwestern section of the United States, principally in Utah and Colorado.

DESTRUCTIVE DISTILLATION OF GILSONITE

In a steel still directly heated by means of electric resistance units is placed 50 pounds of Gilsonite, M.P. 320–360° F. This still is connected to a water cooled condenser and the following fractions obtained at the temperature indicated. For the purpose of further reference in this specification, these fractions have been given the following numbers.

*Table of Gilsonite Distillates Using a 320° F. Melt Point Gilsonite*

The following distillates are obtainable.

| Temperature, °F. | No. | Color | Specific Gravity at 70° F. |
|---|---|---|---|
| 326 to 329 | 1 | clear | 0.61 |
| 330 to 334 | 2 | brownish | 0.73 |
| 339 to 341 | 3 | clear slight red | 1.72 |
| 343 to 345 | 4 | clear | 1.71 |
| 345 to 355 | 5 | ----do---- | 0.053 |
| 355 to 360 | 6 | brownish black | 1.31 |
| 360 to 366 | 7 | clear | 0.63 |
| 369 to 374 | 8 | ----do---- | 0.93 |
| 375 to 380 | 9 | ----do---- | 1.12 |
| 380 to 381 | 10 | reddish brown | 1.19 |
| 385 to 397 | 11 | ----do---- | 2.11 |
| 390 to 393 | 12 | clear | 0.74 |
| 395 to 400 | 13 | ----do---- | 0.87 |
| 410 to 417 | 14 | ----do---- | 0.89 |
| 420 to 423 | 15 | slightly brown clear | 0.79 |
| 430 to 438 | 16 | reddish brown | 0.52 |
| 440 to 443 | 17 | brown | 0.90 |
| 445 to 451 | 18 | clear | 0.67 |
| 455 to 456 | 19 | brown | 2.69 |
| 460 to 465 | 20 | clear | 0.054 |
| 465 to 470 | 21 | clear brownish | 0.093 |
| 478 to 483 | 22 | brown | 0.94 |
| 485 to 490 | 23 | clear | 0.0041 |
| 490 to 493 | 24 | clear reddish | 0.005 |
| 495 to 500 | 25 | brownish red | 0.95 |
| 505 to 509 | 26 | clear | 0.17 |
| 510 to 512 | 27 | ----do---- | 0.19 |
| 518 to 520 | 28 | brown | 1.03 |
| 525 to 535 | 29 | ----do---- | 0.039 |
| 542 to 550 | 30 | brownish clear | 0.73 |
| 570 to 573 | 31 | clear | 0.92 |
| 579 to 582 | 32 | ----do---- | 0.53 |
| 583 to 585 | 33 | ----do---- | 0.72 |
| 586 to 590 | 34 | rown | 2.007 |
| 595 to 600 | 35 | ----do---- | 2.09 |
| | 36 | gray black dust, when cool, remaining in retort. Weight 120 gram to cu. inch. | |

More fractions are obtainable but they are not part of this invention.

EXAMPLE I

A carbon silicate acid is obtained from the 16 fraction by treating as follows.

In a retort that will stand 600 pounds' pressure, place:

1 gal. distillate, fraction 16
12 oz. xylene (dimethylbenzene)
2 oz. triethanolamine (trihydroxytriethylamine)
6 oz. silicon mix (finely ground silicon dioxide 100 mesh)

Heat to 250° F. maintaining a pressure of 30 pounds per square inch with continual agitation for one hour.

The retort is then allowed to cool, maintaining the agitation, and when cool, 1 gallon of distilled water is added. This is then distilled and three fractions taken at 230–240° F., 260–270° F. and 310–315° F., using a water cooled condenser. The last fraction, that is, the one boiling at 310–315° F. is a fluid brownish liquid having a specific gravity of .24 at 70° F., and is then diluted with mineral spirits solvent in the ratio of 1 part distillate to 80 parts solvent. The following solvents have also proven satisfactory: Stoddard Solvents and turpentine. This material has the following formula

$$2H_22CO_2)OH(Si_2O2H_2O$$

This is referred to in this application as $Z_{16}$. It is a hydrocarbon silicon penetrating oil, a silicon carbonate or carboxy acetic acid.

Similar destructive distillation of coal or crude oil may be run and used in place of the 16th fraction from the destructive distillation of Gilsonite, after the addition of xylene, triethanolamine and the silica and distilled, the fraction boiling at 260° F. for crude oil and 310° F. for coal can be used after dilution with mineral spirits.

A product is similarly obtained by treating the #6 fraction as follows.

Mix in a heated retort with agitation:

1 gal. of #6 fraction (an oily brown, black material having a specific gravity of 1.31 at 70° F.)
7 oz. triethanolamine (trihydroxytriethylamine)
1 lb. silicon mix (finely ground silicon dioxide 100 mesh)
20 oz. xylene (dimethylbenzene)

Mix and heat under pressure to 300° F. maintaining a pressure of 20 lbs. per square inch with continual agitation for one hour. Cool and add 1 gal. of distilled water and 1 pt. turpentine. Heat with agitation to 256° F. and distill. An oily distillate having a specific gravity of .63 at 70° F. is obtained. This is a very toxic material and is used in the preparation of insecticides referred to below. This is heretofore referred to as the $Z_6$ material. This material has the following formula:

$$4H_24CO_2)OH(2Si_2O2H_2O$$

EXAMPLE II.—PAINT

A black colloidal non-toxic paint for waterproofing and rust-proofing metal, wood, concrete, etc. which is resistant to heat, acid and alkali and moisture can be applied by brushing, spraying or dipping is prepared as follows.

Mix and heat in an open vessel:

20 gal. petroleum solvent, such as mineral spirits or xylene
10 gal. boiled linseed oil
10 gal. turpentine, wood distilled or gum spirits of turpentine After heating to 100° F. slowly add 125 lbs. pulverized 150–200 mesh Gilsonite, a pigment melting at 320–360° F. This mixture is then heated to 150° F., and to same then is slowly added 4 gallons of a varnish mixture consisting of 17.8% pentaerythritol rosin ester, 30.8% dehydrated castor oil, 1.4% of a mixture of lead, cobalt and manganese naphthenates, and the remainder mineral spirits; and 1 gallon of an emulsifying agent consisting essentially of salts of petroleum sulfonic acids, known as Petronate.

2 qts. of a mixture of 1 part lead, 1 part cobalt and 2 parts manganese drier
1 pt. of the penetrating oil not diluted, obtained as outlined above ($Z_{16}$)

This mixture is heated until the mixture reaches 200° F., continuously mixing for 15 minutes and then allowed to cool. It is drawn off and sealed in containers. This produces approximately 55 gals. of paint.

EXAMPLE III.—ALUMINUM PAINT

An aluminum paint, slightly toxic, which is resistant to heat, acid and alkali, as well as moisture, can be applied by spraying, brushing or dipping, is prepared as follows.
Mix in an open agitator:

12 gal. boiled linseed oil
10 gal. petroleum solvent, such as mineral spirits or xylene
6 gal. paint prepared as in Example II
10 gal. 50–50 coal resin and petroleum solvent, 50% ordinary coal resin, 50% mineral spirits
3 gal. #30 aluminum pigment ground in oil
2 qts. Petronate (wetting agent)
2 qts. mixed drier (1 part lead, 1 part cobalt, 2 parts manganese)
1 pt. carbon silicate acid prepared as set forth above in Example I ($Z_{16}$)

Mix thoroughly until all of the aluminum pigment is suspended, then draw off and seal in containers.

What is claimed is:
1. A paint consisting essentially of 20 gallons of petroleum solvent, 10 gallons of linseed oil, 10 gallons turpentine, 125 pounds of Gilsonite pigment, 4 gallons varnish mixture consisting of 17.8% pentaerythritol rosin ester, 30.8% dehydrated castor oil, 1.4% of a mixture of lead, cobalt and manganese naphthenates, 1 gallon wetting agent consisting essentially of salts of petroleum sulfonic acids, 2 quarts of drier, and 1 pint of a hydrocarbon silicon penetrating oil, obtained by heating a mixture of finely ground silicon dioxide under pressure to a temperature of about 300° F. with a distillate product obtained by subjecting Gilsonite to fractional distillation, said distillate product being that fraction which distills at a temperature range of about 430° F. to 438° F.

2. A coating composition consisting essentially of a major proportion of a petroleum solvent, a lesser proportion of a drying oil, and minor proportions respectively of an aluminum pigment, a wetting agent consisting essentially of salts of petroleum sulfonic acids, a drier and a carbon silicon acid, obtained by heating a mixture of finely ground silicon dioxide under pressure to a temperature of about 300° F. with a distillate product obtained by subjecting Gilsonite to fractional distillation, said distillate product being that fraction which distills at a temperature range of about 430° F. to 438° F.

References Cited in the file of this patent
UNITED STATES PATENTS

| | | |
|---|---|---|
| 2,069,314 | Hunt | Feb. 2, 1937 |
| 2,084,933 | Alvardo | June 22, 1937 |
| 2,492,848 | Crouch | Dec. 27, 1949 |
| 2,994,636 | Davis | Aug. 1, 1961 |
| 3,003,944 | Davis | Oct. 10, 1961 |